(12) United States Patent
Pescianschi

(10) Patent No.: US 10,423,694 B2
(45) Date of Patent: *Sep. 24, 2019

(54) NEURAL NETWORK AND METHOD OF NEURAL NETWORK TRAINING

(71) Applicant: Progress, Inc., West Bloomfield, MI (US)

(72) Inventor: Dmitri Pescianschi, Darmstadt (DE)

(73) Assignee: Progress, Inc., West Bloomfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/449,614

(22) Filed: Mar. 3, 2017

(65) Prior Publication Data

US 2017/0177998 A1    Jun. 22, 2017

Related U.S. Application Data

(63) Continuation-in-part of application No. 15/178,137, filed on Jun. 9, 2016, now Pat. No. 9,619,749, which
(Continued)

(51) Int. Cl.
*G06N 3/08* (2006.01)
*G06F 17/16* (2006.01)
*G06N 3/063* (2006.01)

(52) U.S. Cl.
CPC ............. *G06F 17/16* (2013.01); *G06N 3/063* (2013.01); *G06N 3/084* (2013.01)

(58) Field of Classification Search
None
See application file for complete search history.

(56) References Cited

U.S. PATENT DOCUMENTS 4,918,618 A    4/1990    Tomlinson
4,979,124 A    12/1990   Sachse et al.
(Continued)

OTHER PUBLICATIONS

Fashandi H et al, Face Detection Using CMAC Neural Network, Artificial Intelligence and Soft Computing, May 18, 2004, pp. 724-729, Spinger-Verlag, Berlin/Heidelberg.
(Continued)

*Primary Examiner* — Robert A Cassity
*Assistant Examiner* — Michael Zidanic
(74) *Attorney, Agent, or Firm* — Quinn IP Law

(57) ABSTRACT

A neural network includes inputs for receiving input signals, and synapses connected to the inputs and having corrective weights organized in an array. Training images are either received by the inputs as an array or codified as such during training of the network. The network also includes neurons, each having an output connected with at least one input via one synapse and generating a neuron sum array by summing corrective weights selected from each synapse connected to the respective neuron. Furthermore, the network includes a controller that receives desired images in an array, determines a deviation of the neuron sum array from the desired output value array, and generates a deviation array. The controller modifies the corrective weight array using the deviation array. Adding up the modified corrective weights to determine the neuron sum array reduces the subject deviation and generates a trained corrective weight array for concurrent network training.

24 Claims, 4 Drawing Sheets

Related U.S. Application Data is a continuation-in-part of application No. 14/862,337, filed on Sep. 23, 2015, now Pat. No. 9,390,373, and a continuation of application No. PCT/US2015/019236, filed on Mar. 6, 2015.

(60) Provisional application No. 61/949,210, filed on Mar. 6, 2014, provisional application No. 62/106,389, filed on Jan. 22, 2015, provisional application No. 62/173,163, filed on Jun. 9, 2015.

(56) References Cited

U.S. PATENT DOCUMENTS

| | | |
|---|---|---|
| 5,253,329 A | 10/1993 | Villarreal |
| 5,299,285 A | 3/1994 | Tawel |
| 5,479,575 A | 12/1995 | Yoda |
| 5,493,688 A | 2/1996 | Weingard |
| 5,566,273 A | 10/1996 | Huang et al. |
| 5,671,337 A | 9/1997 | Yoshihara |
| 5,682,503 A | 10/1997 | Yoda |
| 5,870,729 A | 2/1999 | Yoda |
| 7,577,631 B2 | 8/2009 | Feldhake |
| 7,814,038 B1 | 10/2010 | Repici |
| 7,904,398 B1 | 3/2011 | Repici |
| 2010/0088263 A1 | 4/2010 | Deco et al. |
| 2012/0166374 A1 | 6/2012 | Moussa et al. |

OTHER PUBLICATIONS

Yu-Yi Liao et al, CMAC With Clustering Memory and Its Application to Facial Expression Recognition, International Journal of Pattern Recognition and Artificial Intelligence, pp. 1055-1072, vol. 25, No. 7, World Scientific Publishing, SI.

P.C. Parks et al, A comparison of five algorithms for the training of CMAC memories for learning control systems, Automatica, Sep. 1, 1992, pp. 1027-1035, vol. 28, No. 5, Amsterdam, NL.

NEURAL NETWORK AND METHOD OF NEURAL NETWORK TRAINING

CROSS-REFERENCE TO RELATED APPLICATION(S)

This application is a continuation-in-part of U.S. Utility application Ser. No. 15/178,137 filed Jun. 9, 2016, which is a continuation-in-part of U.S. Utility Bypass application Ser. No. 14/862,337 filed Sep. 23, 2015, and is a continuation of International Application Serial No. PCT/US 2015/19236 filed Mar. 6, 2015, which claims the benefit of U.S. Provisional Application Ser. No. 61/949,210 filed Mar. 6, 2014, and U.S. Provisional Application Ser. No. 62/106,389 filed Jan. 22, 2015, and also claims the benefit of U.S. Provisional Application Ser. No. 62/173,163 filed Jun. 9, 2015, the entire content of which is similarly incorporated by reference.

TECHNICAL FIELD

The disclosure relates to an artificial neural network and a method of training the same.

BACKGROUND

In machine learning, the term "neural network" generally refers to software and/or computer architecture, i.e., the overall design or structure of a computer system or a microprocessor, including the hardware and software required to run it. Artificial neural networks may be a family of statistical learning algorithms inspired by biological neural networks, a.k.a., the central nervous systems of animals, in particular the brain. Artificial neural networks are primarily used to estimate or approximate generally unknown functions that may depend on a large number of inputs. Such neural networks have been used for a wide variety of tasks that are difficult to resolve using ordinary rule-based programming, including computer vision and speech recognition.

Artificial neural networks are generally presented as systems of "neurons" which may compute values from inputs, and, as a result of their adaptive nature, are capable of machine learning, as well as pattern recognition. Each neuron frequently connects with several inputs through synapses having synaptic weights.

Neural networks are not programmed as typical software and hardware, but are trained. Such training is typically accomplished via analysis of a sufficient number of representative examples and by statistical or algorithmic selection of synaptic weights, so that a given set of input images corresponds to a given set of output images. A common criticism of classical neural networks is that significant time and other resources are frequently required for their training.

Various artificial neural networks are described in the following U.S. Pat. Nos. 4,979,124; 5,479,575; 5,493,688; 5,566,273; 5,682,503; 5,870,729; 7,577,631; and 7,814,038.

SUMMARY

A neural network includes a plurality of inputs to the neural network configured to receive training images. The training images are either received by the plurality of inputs as a training input value array or codified as the training input value array during training of the neural network, i.e., after having been received by the plurality of inputs. The neural network also includes a plurality of synapses. Each synapse is connected to one of the plurality of inputs and includes a plurality of corrective weights. Each corrective weight is defined by a weight value, and the corrective weights of the plurality of synapses are organized in a corrective weight array.

The neural network additionally includes a plurality of neurons. Each neuron has at least one output and is connected with at least one of the plurality of inputs via at least one of the plurality of synapses. Each neuron is configured to add up the weight values of the corrective weights corresponding to each synapse connected to the respective neuron, such that the plurality of neurons generate a neuron sum array. The neural network also includes a controller configured to receive desired images organized as a desired output value array.

The controller is also configured to determine a deviation of the neuron sum array from the desired output value array and generate a deviation array. The controller is additionally configured to modify the corrective weight array using the determined deviation array. Adding up the modified corrective weight values to determine the neuron sum array reduces the deviation of the neuron sum array from the desired output value array, i.e., compensates for errors generated by the neuron network during training, and generates a trained corrective weight array to thereby facilitate concurrent or parallel training of the neural network.

In a trained neural network, the plurality of inputs to the neural network may be configured to receive input images. Such input images may be either received as an input value array or codified as the input value array during recognition of the images by the neural network. Each synapse may include a plurality of trained corrective weights of the trained corrective weight array. Additionally, each neuron may be configured to add up the weight values of the trained corrective weights corresponding to each synapse connected to the respective neuron, such that the plurality of neurons generate a recognized images array, thereby providing recognition of such input images.

The neural network may also include a set of distributors. In such an embodiment, the set of distributors may be configured to codify each of the training images and input images as the respective training input value array and input value array. Such a set of distributors may be operatively connected to the plurality of inputs for receiving the respective training images and input images.

The controller may additionally be programmed with an array of target deviation of the neuron sum array from the desired output value array. Furthermore, the controller may be configured to complete training of the neural network when the deviation of the neuron sum array from the desired output value array is within an acceptable range of the array of target deviation.

The training input value array, input value array, corrective weight array, neuron sum array, desired output value array, deviation array, trained corrective weight array, recognized image array, and target deviation array may be organized, respectively, as a training input value matrix, input value matrix, corrective weight matrix, neuron sum matrix, desired output value matrix, deviation matrix, trained corrective weight matrix, recognized image matrix, and target deviation matrix.

The neural network may additionally include a plurality of data processors. In such an embodiment, the controller may be additionally configured to partition at least one of the respective input value, training input value, corrective weight, neuron sum, and desired output value matrices into respective sub-matrices and communicate a plurality of the resultant sub-matrices to the plurality of data processors for separate parallel mathematical operations therewith. Such partitioning of any of the subject matrices into respective sub-matrices facilitates concurrent or parallel data processing and an increase in speed of either image recognition of the input value matrix or training of the neural network. Such concurrent or parallel data processing also permits scalability of the neural network.

The controller may modify the corrective weight matrix by applying an algebraic matrix operation to the training input value matrix and the corrective weight matrix to thereby train the neural network.

The mathematical matrix operation may include a determination of a mathematical product of the training input value and corrective weight matrices to thereby form a current training epoch weight matrix.

The controller may also be configured to subtract the neuron sum matrix from the desired output value matrix to generate a matrix of deviation of neuron sums. Additionally, the controller may be configured to divide the matrix of deviation of neuron sums by the number of inputs connected to the respective neuron to generate a matrix of deviation per neuron input.

The controller may be also configured to determine a number of times each corrective weight was used during one training epoch of the neural network. The controller may additionally be configured to form an averaged deviation matrix for the one training epoch using the determined number of times each corrective weight was used during the one training epoch. Furthermore, the controller may be configured to add the averaged deviation matrix for the one training epoch to the corrective weight matrix to thereby generate the trained corrective weight matrix and complete the one training epoch.

A method of operating such a neural network, i.e., for training and image recognition, is also disclosed.

Additionally disclosed are a non-transitory computer-readable storage device for operating an artificial neural network and an apparatus for operating an artificial neural network.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
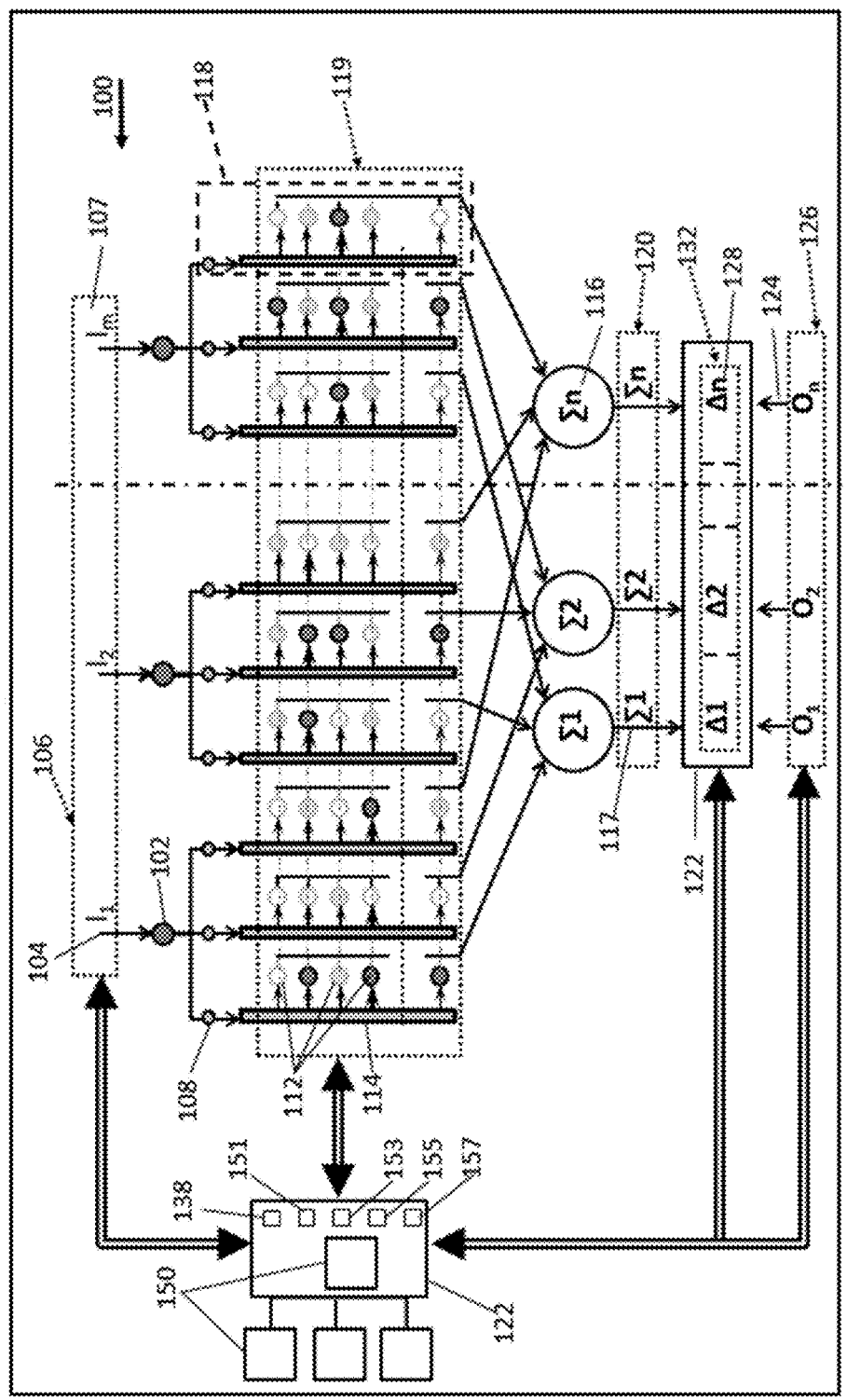
FIG. 1 is an illustration of a "progressive neural network" (p-net) having a plurality of synapses and a plurality of corrective weights associated with each synapse, according to the disclosure.

Referring to the drawings, wherein like reference numbers refer to like components, FIG. 1 shows a general schematic view of a progressive artificial neural network 100, thereafter "the network", or "p-net" 100. The p-net 100 may be implemented as software programmed into an apparatus, such as a computer or a system of computers, or be configured as a combination of software and hardware incorporated into a non-transitory computer-readable storage device, or a hardware device such as a microchip.

The p-net 100 includes a plurality of inputs 102, and is a means for executing the actions described in detail below. Each input 102 is configured to receive an input signal 104, wherein the input signals are represented as $I_1, I_2 \ldots I_m$ in FIGS. 1-3. Each input signal $I_1, I_2 \ldots I_m$ represents a value of some characteristic(s) of an input image 106, for example, a magnitude, frequency, phase, signal polarization angle, or association with different parts of the input image 106. The term "image" as employed herein is intended to denote any type of information or data received for processing or generated by the neural network. Each input signal 104 has an input value, wherein together the plurality of input signals 104 generally describes the input image 106. A trained p-net is designated via numeral 100A. When the p-net 100 is being trained, the input image 106 is defined as a training image, while in the trained p-net 100A the input image 106 is intended to undergo recognition.

Each input value may be within a value range that lies between $-\infty$ and $+\infty$ and may be set in digital and/or analog forms. The range of the input values may depend on a set of training images. In the simplest case, the range input values could be the difference between the smallest and largest values of input signals for all training images. For practical reasons, the range of the input values may be limited by eliminating input values that are deemed too high. For example, such limiting of the range of the input values may be accomplished via known statistical methods for variance reduction, such as importance sampling. Another example of limiting the range of the input values may be designation of all signals that are lower than a predetermined minimum level to a specific minimum value and designation of all signals exceeding a predetermined maximum level to a specific maximum value. The training images 106 are either received by the plurality of inputs 102 as a training input value array 107 or codified as a training input value array 107 during training of the p-net 100, i.e., after having been received by the plurality of inputs.

Figure 2:
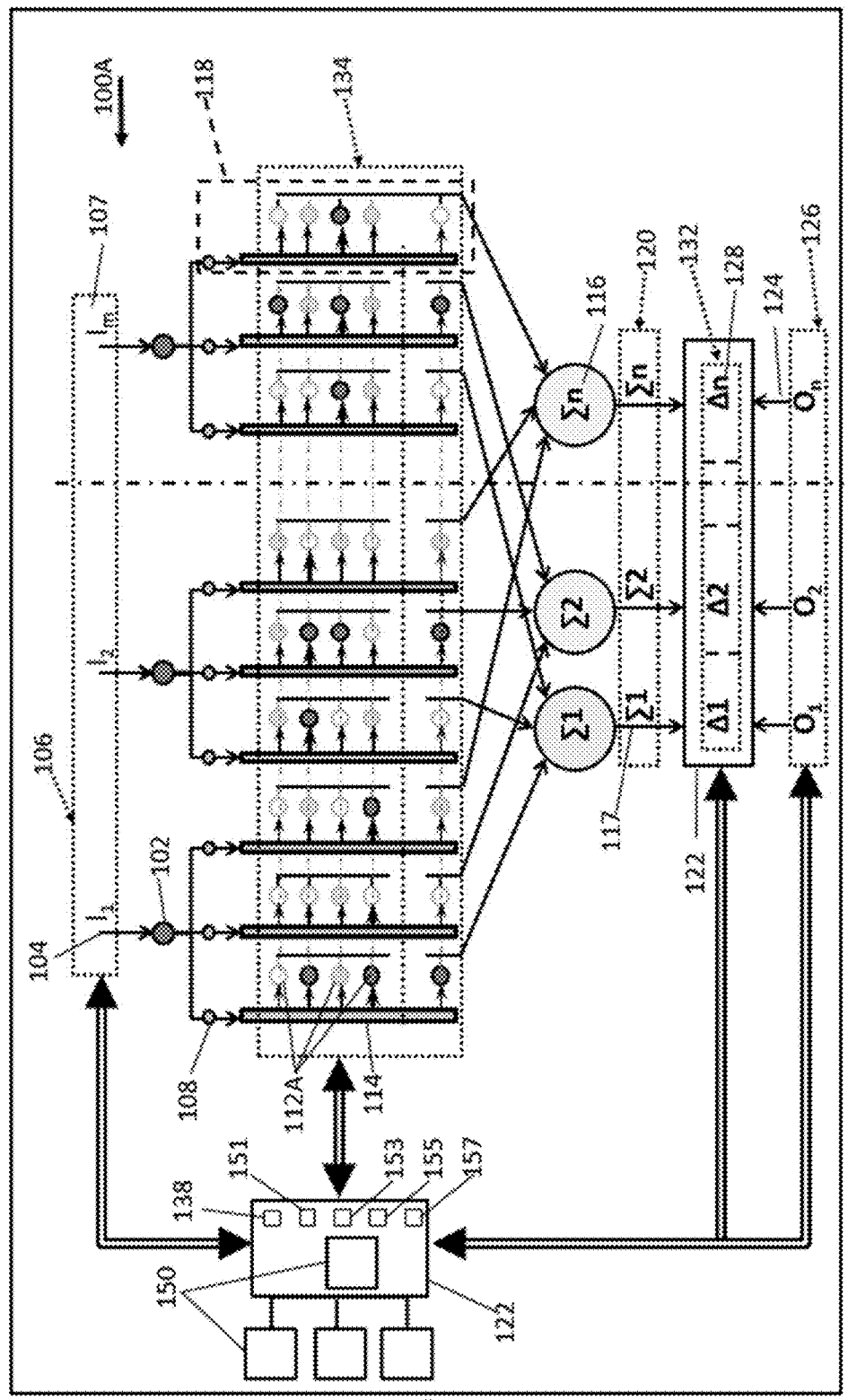
FIG. 2 is an illustration of the p-net in the process of being trained, according to the disclosure.
Figure 3:
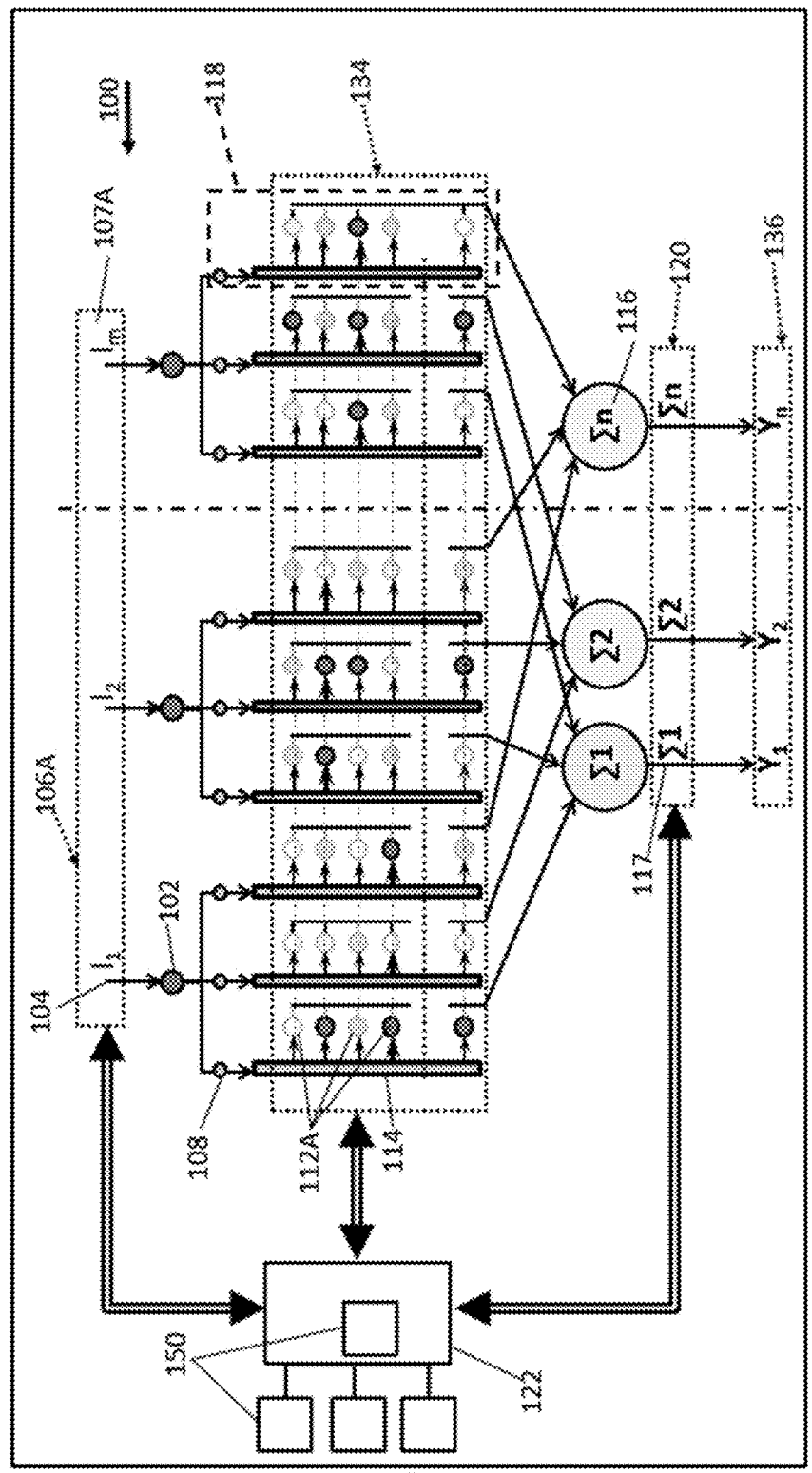
FIG. 3 is an illustration of the p-net in the process of image recognition, according to the disclosure.

The p-net 100 also includes a plurality or a set of synapses 118. Each synapse 118 is connected to one of the plurality of inputs 102, includes a plurality of corrective weights 112, and may also include a synaptic weight 108, as shown in FIGS. 1-3. Each corrective weight 112 is defined by a respective weight value. Additionally, the corrective weights 112 of all the synapses 118 are organized as, i.e., in the form of, a corrective weight array 119. Accordingly, in FIG. 1, the corrective weight array 119 includes all the corrective weights 112 within the dashed box 119. The p-net 100 may also include a set of distributors 114. In such an embodiment, each distributor 114 is operatively connected to one of the plurality of inputs 102 for receiving the respective input signal 104.

The p-net 100 additionally includes a set of neurons 116, and is a means for executing the actions described in detail below. Each neuron 116 has at least one output 117 and is connected with at least one of the plurality of inputs 102 via one synapse 118. Each neuron 116 is configured to add up or sum the corrective weight values of the corrective weights 112 selected from each synapse 118 connected to the respective neuron 116 and thereby generate and output a neuron sum array 120, otherwise designated as $\Sigma n$. A separate distributor 114 may be used for each synapse 118 of a given input 102, as shown in FIGS. 1-3. Alternatively, a single distributor may be used for all such synapses (not shown). During formation or setup of the p-net 100, all corrective weights 112 are assigned initial values, which may change during the process of p-net training, shown in FIG. 2. The initial value of the corrective weight 112 may be selected randomly, calculated with the help of a pre-determined mathematical function, selected from a predetermined template, etc. Initial values of the corrective weights 112 may be either identical or distinct for each corrective weight 112, and may also be zero.

As shown in FIG. 2, the p-net 100 also includes a controller 122 configured to regulate training of the p-net 100, and as such is a means for executing the actions described in detail below. In order to appropriately perform the tasks described in detail below, the controller 122 includes a memory, at least some of which is tangible and non-transitory. The memory of the controller 122 may be a recordable medium that participates in providing computer-readable data or process instructions. Such a medium may take many forms, including but not limited to non-volatile media and volatile media. Non-volatile media for the controller 122 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer.

Memory of the controller 122 may also include an appropriate medium, for example a magnetic or an optical medium. The controller 122 may be configured or equipped with other required computer hardware, such as a high-speed clock, requisite Analog-to-Digital (A/D) and/or Digital-to-Analog (D/A) circuitry, necessary input/output circuitry and devices (I/O), as well as appropriate signal conditioning and/or buffer circuitry. Algorithms required by the controller 122 or accessible thereby may be stored in the memory and automatically executed to provide the required functionality described in detail below.

The controller 122 may be programmed to organize the corrective weights 112 into the corrective weight array 119. The controller 122 is also configured to receive desired images 124 organized as a desired output value array 126, determine a deviation 128 of the neuron sum array 120 from the desired output value array, and generate a deviation array 132. The controller 122 is further configured to modify the corrective weight array 119 using the determined deviation array 132. In such a case, adding up the modified corrective weight values to determine the neuron sum array 120 reduces, i.e., minimizes, the deviation 128 of the neuron sum array 120 from the desired output value array 126 to generate a trained corrective weight array 134. As shown in FIGS. 2-3, and analogous to the corrective weight array 119 shown in FIG. 1, the trained corrective weight array 134 includes all the corrective weights 112 within the dashed box 134. As shown in FIGS. 2-3, and analogous to FIG. 1, the corrective weight array 119 includes all the corrective weights 112 within the dashed box 119 and may include the distributors 114 associated therewith. Therefore, the minimized deviation 128 of the neuron sum array 120 compensates for errors generated by the p-net 100. Furthermore, the generated trained corrective weight array 134 facilitates concurrent or parallel training of the p-net 100.

In a trained p-net 100A, shown in FIG. 3, the plurality of inputs 102 to the p-net may be configured to receive input images 106. Such input images 106 may be either received as an input value array 107A or codified as an input value array 107A during recognition of the images by the p-net 100. Each synapse 118 may include a plurality of trained corrective weights 112A. Additionally, each neuron 116 may be configured to add up the weight values of the trained corrective weights 112A corresponding to each synapse 118 connected to the respective neuron, such that the plurality of neurons generate a recognized images array 136, thereby providing recognition of the input images 106. In the embodiment of the p-net 100 and the trained p-net 100A that includes the set of distributors 114, the distributors may be configured to codify the training and input images 106 as the respective training input value array 107 and input value array 107A. Accordingly, such a set of distributors 114 being operatively connected to the plurality of inputs 102 for receiving each of the respective training and input images 106. The above operations may be performed using structured matrices, specifically a trained corrective weight matrix in place of the trained corrective weight array 134, as will be described in detail below.

The controller 122 may additionally be programmed with an array of target deviation or target deviation array 138 of the neuron sum array 120 from the desired output value array 126. Furthermore, the controller 122 may be configured to complete training of the p-net 100 when the deviation 128 of the neuron sum array 120 from the desired output value array 126 is within an acceptable range 139 of the target deviation array 138. The acceptable range 139 may be referenced against a maximum or a minimum value in, or an average value of the target deviation array 138. Alternatively, the controller 122 may be configured to complete training of the p-net 100 when the speed of reduction of the deviation 128 or convergence of the training input value array 107 and the desired output value array 126 falls to a predetermined speed value 140. The acceptable range 139 and/or the predetermined speed value 140 may be programmed into the controller 122.

The training input value array 107, input value array 107A, the corrective weight array 119, neuron sum array 120, desired output value array 126, deviation array 132, trained corrective weight array 134, recognized images array 136, and target deviation array 138, i.e., parameter values therein, may be organized, respectively, as a training input value matrix 141, input value matrix 141A, corrective weight matrix 142, neuron sum matrix 143, desired output value matrix 144, deviation matrix 145, trained corrective weight matrix 146, recognized images matrix 147, and target deviation matrix 148. Wherein in each respective array 107, 107A, 119, 120, 126, 132, 134, 136, and 138, values of the respective parameters may be organized, for example, in the form of a processor accessible data table, the values in the respective matrices 141, 141A, 142, 143, 144, 145, 146, 147, and 148 are specifically organized to enable application of algebraic matrix operations to each respective matrix individually, as well as to combinations thereof. The matrices 141, 141A, 142, 143, 144, 145, 146, 147, and 148 are not specifically shown in the figures, but, when organized as such, are to be understood as taking place of the respective arrays 107, 107A, 119, 120, 126, 132, 134, 136, and 138.

In the examples below, for illustration purposes, particular matrices are depicted with arbitrary number of columns and rows. For example, the training images may be received and/or organized in an input training matrix |I|:

|         | Input 1   | Input 2   | Input 3   |
|---------|-----------|-----------|-----------|
| Image 1 | $I_{11}$  | $I_{21}$  | $I_{31}$  |
| Image 2 | $I_{12}$  | $I_{22}$  | $I_{32}$  |
| Image 3 | $I_{13}$  | $I_{23}$  | $I_{33}$  |

Subsequently, the above training input images matrix may be converted via the controller 122 into the training input value matrix 141, which is represented as matrix |C|. Each matrix |C| will have a corresponding number of columns for the number of inputs "I", but accounting for a specific number of intervals "i", and a corresponding number of rows for the number of images.

|         | Input 1 |  |  |  | Input 2 |  |  |  | Input 3 |  |  |  |
|---------|----|----|----|----|----|----|----|----|----|----|----|----|
|         | i1 | i2 | i3 | i4 | i1 | i2 | i3 | i4 | i1 | i2 | i3 | i4 |
| Image 1 | $C_{111}$ | $C_{121}$ | $C_{131}$ | $C_{141}$ | $C_{211}$ | $C_{221}$ | $C_{231}$ | $C_{241}$ | $C_{311}$ | $C_{321}$ | $C_{331}$ | $C_{341}$ |
| Image 2 | $C_{112}$ | $C_{122}$ | $C_{132}$ | $C_{142}$ | $C_{212}$ | $C_{222}$ | $C_{232}$ | $C_{242}$ | $C_{312}$ | $C_{322}$ | $C_{332}$ | $C_{342}$ |
| Image 3 | $C_{113}$ | $C_{123}$ | $C_{133}$ | $C_{143}$ | $C_{213}$ | $C_{223}$ | $C_{233}$ | $C_{243}$ | $C_{313}$ | $C_{323}$ | $C_{333}$ | $C_{343}$ |

In matrix |C|, intervals "i" identified with a specific corrective weight 112 that will be used during training. In columns corresponding to intervals "i", the values of signals may be replaced with ones (1) to signify that the particular signal will be used in the particular interval, while in other intervals for the subject signal, the values of signals may be replaced with zeros (0) to signify that the particular interval will not be considered.

An exemplary corrective weight matrix 146 may be formed as matrix |W| shown below:

|         | Intervals | Output 1 | Output 2 | Output 3 |
|---------|-----------|----------|----------|----------|
| Input 1 | i1 | $W_{111}$ | $W_{112}$ | $W_{113}$ |
|         | i2 | $W_{121}$ | $W_{122}$ | $W_{123}$ |
|         | i3 | $W_{131}$ | $W_{132}$ | $W_{133}$ |
|         | i4 | $W_{141}$ | $W_{142}$ | $W_{143}$ |
| Input 2 | i1 | $W_{211}$ | $W_{212}$ | $W_{213}$ |
|         | i2 | $W_{221}$ | $W_{222}$ | $W_{223}$ |
|         | i3 | $W_{231}$ | $W_{232}$ | $W_{233}$ |
|         | i4 | $W_{241}$ | $W_{242}$ | $W_{243}$ |
| Input 3 | i1 | $W_{311}$ | $W_{312}$ | $W_{313}$ |
|         | i2 | $W_{321}$ | $W_{322}$ | $W_{323}$ |
|         | i3 | $W_{331}$ | $W_{332}$ | $W_{333}$ |
|         | i4 | $W_{341}$ | $W_{342}$ | $W_{343}$ |

The neuron sum matrix 143 may be represented as matrix |Σ| shown below:

$$|\Sigma| = |C| \times |W| = \begin{matrix} \Sigma_{11} & \Sigma_{12} & \Sigma_{13} \\ \Sigma_{21} & \Sigma_{22} & \Sigma_{23} \\ \Sigma_{31} & \Sigma_{32} & \Sigma_{33} \end{matrix}$$

$$\Sigma_{11} = C_{111} \times W_{111} + C_{121} \times W_{121} + C_{131} \times W_{131} \ldots$$
$$\Sigma_{21} = C_{211} \times W_{211} + C_{221} \times W_{221} + C_{231} \times W_{231} \ldots$$
$$\Sigma_{31} = C_{311} \times W_{311} + C_{321} \times W_{321} + C_{331} \times W_{331} \ldots$$
$$\Sigma_{12} = C_{112} \times W_{112} + C_{122} \times W_{122} + C_{132} \times W_{132} \ldots$$
$$\Sigma_{22} = C_{212} \times W_{212} + C_{222} \times W_{222} + C_{232} \times W_{232} \ldots$$

The desired output value matrix 144 may be formed as matrix |O|, as shown below:

|         | Output 1 | Output 2 | Output 3 |
|---------|----------|----------|----------|
| Image 1 | $O_{11}$ | $O_{12}$ | $O_{13}$ |
| Image 2 | $O_{21}$ | $O_{22}$ | $O_{23}$ |
| Image 3 | $O_{31}$ | $O_{32}$ | $O_{33}$ |

The deviation 128 of the neuron sum matrix 143 may be determined from the desired output value matrix 144 to generate the deviation matrix 148 represented as matrix |E| below:

$$|E| = |O| - |\Sigma| = \begin{matrix} \Sigma_{11} & \Sigma_{12} & \Sigma_{13} \\ \Sigma_{21} & \Sigma_{22} & \Sigma_{23} \\ \Sigma_{31} & \Sigma_{32} & \Sigma_{33} \end{matrix}$$

Wherein, $$\Sigma_{11} = O_{11} - \Sigma_{11}$$
$$\Sigma_{21} = O_{21} - \Sigma_{21}$$
$$\Sigma_{12} = O_{12} - \Sigma_{12} \text{ etc.}$$

The corrective weight matrix 142, represented as matrix |W| below, may be modified using the determined deviation matrix 145, which permits adding up the modified corrective weight 112 values to determine the neuron sum matrix 143 to minimize the deviation of the neuron sum matrix 143 from the desired output value matrix 144 to generate a trained corrective weight matrix 146, represented as matrix $|W_{trained}|$. The matrix $|W_{trained}|$ is derived according to expression $|W_{trained}| = |W| + |\nabla W|$ (wherein the factor $|\nabla W|$ will be described in detail below):

|         | Intervals | Output 1 | Output 2 | Output 3 |
|---------|-----------|----------|----------|----------|
| Input 1 | i1 | $W_{111} + \nabla W_{111}$ | $W_{112} + \nabla W_{112}$ | $W_{113} + \nabla W_{113}$ |
|         | i2 | $W_{121} + \nabla W_{121}$ | $W_{122} + \nabla W_{122}$ | $W_{123} + \nabla W_{123}$ |
|         | i3 | $W_{131} + \nabla W_{131}$ | $W_{132} + \nabla W_{132}$ | $W_{133} + \nabla W_{133}$ |
|         | i4 | $W_{141} + \nabla W_{141}$ | $W_{142} + \nabla W_{142}$ | $W_{143} + \nabla W_{143}$ |
| Input 2 | i1 | $W_{211} + \nabla W_{211}$ | $W_{212} + \nabla W_{212}$ | $W_{213} + \nabla W_{213}$ |
|         | i2 | $W_{221} + \nabla W_{221}$ | $W_{222} + \nabla W_{222}$ | $W_{223} + \nabla W_{223}$ |
|         | i3 | $W_{231} + \nabla W_{231}$ | $W_{232} + \nabla W_{232}$ | $W_{233} + \nabla W_{233}$ |
|         | i4 | $W_{241} + \nabla W_{241}$ | $W_{242} + \nabla W_{242}$ | $W_{243} + \nabla W_{243}$ |
| Input 3 | i1 | $W_{311} + \nabla W_{311}$ | $W_{312} + \nabla W_{312}$ | $W_{313} + \nabla W_{313}$ |
|         | i2 | $W_{321} + \nabla W_{321}$ | $W_{322} + \nabla W_{322}$ | $W_{323} + \nabla W_{323}$ |
|         | i3 | $W_{331} + \nabla W_{331}$ | $W_{332} + \nabla W_{332}$ | $W_{333} + \nabla W_{333}$ |
|         | i4 | $W_{341} + \nabla W_{341}$ | $W_{342} + \nabla W_{342}$ | $W_{343} + \nabla W_{343}$ |

As discussed above, the formation of the trained corrective weight array 134 and the trained corrective weight matrix 146 facilitates concurrent training of the p-net 100.

In the embodiment of image recognition (shown in FIG. 3) using the trained p-net 100A, concurrent recognition of a batch of input images 106 may be provided using matrix operation described above. Specifically, the trained p-net 100A the corrective weights array, which may be represented as a two-dimensional n×k matrix |W|, where "n" is the number of neurons 116 and "k" is the number of corrective weights 112 in a particular neuron. The matrix |W| may be generally represented as follows:

| $W_{11}$ | $W_{12}$ | $W_{13}$ | ... | $W_{1k}$ |
|---|---|---|---|---|
| $W_{21}$ | $W_{22}$ | $W_{23}$ | ... | $W_{2k}$ |
| $W_{31}$ | $W_{32}$ | $W_{33}$ | ... | $W_{3k}$ |
| $W_{41}$ | $W_{42}$ | $W_{43}$ | ... | $W_{4k}$ |
| ... | ... | ... | ... | ... |
| $W_{n1}$ | $W_{n2}$ | $W_{n3}$ | ... | $W_{nk}$ |

For concurrent recognition of a batch of input images 106, the input images to be recognized may be presented as a v×k matrix |Ir|, where "v" is the number of recognizable images, "k" is the number of corrective weights 112 in a particular neuron 116. The matrix |Ir| of input images 106 for recognition may be generally represented as follows:

| $Ir_{11}$ | $Ir_{21}$ | $Ir_{31}$ | ... | $Ir_{v1}$ |
|---|---|---|---|---|
| $Ir_{12}$ | $Ir_{22}$ | $Ir_{32}$ | ... | $Ir_{v2}$ |
| $Ir_{13}$ | $Ir_{23}$ | $Ir_{33}$ | ... | $Ir_{v3}$ |
| $Ir_{14}$ | $Ir_{24}$ | $Ir_{34}$ | ... | $Ir_{v4}$ |
| ... | ... | ... | ... | ... |
| $Ir_{1k}$ | $Ir_{2k}$ | $Ir_{3k}$ | ... | $Ir_{vk}$ |

In the above matrix |Ir|, each row of the matrix is a single image subjected to recognition.

Concurrent recognition of a batch of input images 106 may be provided by multiplication of the matrix |W| by a transposed matrix $|I|^T$, to generate the recognized image matrix 147, represented by a symbol "|Y|", and represented as follows:

$$|Y|=|W|\times |Ir|^T$$

The matrix |Y| has dimensions n×v. Each column of the matrix |Y| is a single output or recognized image obtained by the trained p-net 100A. The matrix |Y| may be generally depicted as follows:

| $Y_{11}$ | $Y_{12}$ | $Y_{13}$ | ... | $Y_{1v}$ |
|---|---|---|---|---|
| $Y_{21}$ | $Y_{22}$ | $Y_{23}$ | ... | $Y_{2v}$ |
| $Y_{31}$ | $Y_{32}$ | $Y_{33}$ | ... | $Y_{3v}$ |
| $Y_{41}$ | $Y_{42}$ | $Y_{43}$ | ... | $Y_{4v}$ |
| ... | ... | ... | ... | ... |
| $Y_{n1}$ | $Y_{n2}$ | $Y_{n3}$ | ... | $Y_{nv}$ |

Each of the p-net 100 and 100A may additionally include a data processor 150, which may be a sub-unit of the controller 122. In such embodiments, the controller 122 may be additionally configured to partition or cut-up at least one of the respective training input value matrix 141, input value matrix 141A, corrective weight matrix 142, neuron sum matrix 143, and desired output value matrix 144 into respective sub-matrices. The controller 122 may also be configured to communicate a plurality of the resultant sub-matrix or sub-matrices to the data processor 150 for separate mathematical operations therewith. Such partitioning of any of the subject matrices 141, 142, 143, and 144 into respective sub-matrices facilitates concurrent or parallel data processing and an increase in speed of either image recognition of the input value matrix 141A or training of the p-net 100. Such concurrent or parallel data processing also permits scalability of the p-net 100 or 100A, i.e., provides ability to vary the size of the p-net by limiting the size of the respective matrices being subjected to algebraic manipulations on a particular processor and/or breaking up the matrices between multiple processors, such as the illustrated processor 150. As shown in FIGS. 1-3, in such an embodiment of the p-net 100 and 100A, multiple data processors 150 in communication with the controller 122 may be employed, whether as part of the controller 122 or arranged distally therefrom, and configured to operate separately and in parallel.

The controller 122 may modify the corrective weight matrix 142 by applying an algebraic matrix operation to the training input value matrix 141A and the corrective weight matrix to thereby train the p-net 100. Such a mathematical matrix operation may include a determination of a mathematical product of the input value matrix 141A and the corrective weight matrix 146 to thereby form a current training epoch weight matrix 151. The controller 122 may also be configured to subtract the neuron sum matrix 143 from the desired output value matrix 144 to generate a matrix of deviation of neuron sums 153 depicted as matrix |E| described above. Additionally, the controller 122 may be configured to divide the matrix of deviation of neuron sums 153 by the number of synapses 118, identified below with a letter "m", connected to the respective neuron 116 to generate a matrix of deviation per neuron input 155, represented below by the symbol "|ΔW|", as follows:

$$|\Delta W|=|E|/m$$

The controller 122 may be additionally configured to determine a number of times each corrective weight 112 was used during one training epoch of the p-net 100 represented in the expression below by the symbol "|S|". As shown below, the matrix |S| is obtained via multiplication of the training input value matrix 141A by a unit vector:

$$|S| = \begin{matrix} C11 & C12 & C13 \\ C21 & C22 & C23 \\ C31 & C32 & C33 \end{matrix} \times \begin{matrix} 1 \\ 1 \\ 1 \end{matrix}$$

The controller 122 may be further configured to form an averaged deviation matrix 157, represented below by the symbol "|∇W|", for the one training epoch using the determined number of times each corrective weight was used during the one training epoch.

$$|\nabla W|=|\Delta W|/|S|$$

Furthermore, the controller 122 may be configured to add the averaged deviation matrix 157 for the one training epoch to the corrective weight matrix 142 to thereby generate the trained corrective weight matrix 146, represented below as $|W_{trained}|$, and complete the one training epoch as shown below:

$$|W_{trained}|=|W|+|\nabla W|$$

| | Intervals | Output 1 | Output 2 | Output 3 |
|---|---|---|---|---|
| Input 1 | i1 | $W_{111} + VW_{111}$ | $W_{112} + VW_{112}$ | $W_{113} + VW_{113}$ |
| | i2 | $W_{121} + VW_{121}$ | $W_{122} + VW_{122}$ | $W_{123} + VW_{123}$ |
| | i3 | $W_{131} + VW_{131}$ | $W_{132} + VW_{132}$ | $W_{133} + VW_{133}$ |
| | i4 | $W_{141} + VW_{141}$ | $W_{142} + VW_{142}$ | $W_{143} + VW_{143}$ |
| Input 2 | i1 | $W_{211} + VW_{211}$ | $W_{212} + VW_{212}$ | $W_{213} + VW_{213}$ |
| | i2 | $W_{221} + VW_{221}$ | $W_{222} + VW_{222}$ | $W_{223} + VW_{223}$ |
| | i3 | $W_{231} + VW_{231}$ | $W_{232} + VW_{232}$ | $W_{233} + VW_{233}$ |
| | i4 | $W_{241} + VW_{241}$ | $W_{242} + VW_{242}$ | $W_{243} + VW_{243}$ |

|  | Intervals | Output 1 | Output 2 | Output 3 |
|---|---|---|---|---|
| Input 3 | i1 | $W_{311} + VW_{311}$ | $W_{312} + VW_{312}$ | $W_{313} + VW_{313}$ |
|  | i2 | $W_{321} + VW_{321}$ | $W_{322} + VW_{322}$ | $W_{323} + VW_{323}$ |
|  | i3 | $W_{331} + VW_{331}$ | $W_{332} + VW_{332}$ | $W_{333} + VW_{333}$ |
|  | i4 | $W_{341} + VW_{341}$ | $W_{342} + VW_{342}$ | $W_{343} + VW_{343}$ |

Figure 4:
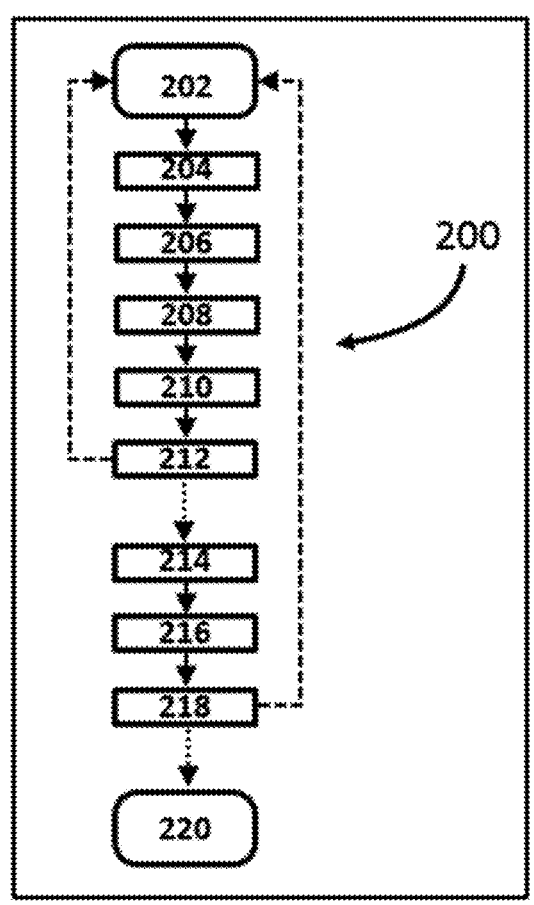
FIG. 4 is a flow diagram of a method for operating the neural network shown in FIGS. 2-3.

FIG. 4 depicts a method 200 for operating the p-net 100, as described above with respect to FIGS. 1-3. The method 200 is configured to improve operation of an apparatus, such as a computer, or a system of computers employed in implementing supervised training using one or more data processors, such as the processor 150. The method 200 may be programmed into a non-transitory computer-readable storage device for operating the p-net 100 and encoded with instructions executable to perform the method.

The method 200 commences in frame 202 where the method includes receiving, via the plurality of inputs 102, the training images 106. As described above with respect to structure of the p-net 100 depicted in FIG. 1, the training images 106 may either be received as the training input value array 107 prior to commencement of the subject training phase or codified as the training input value array during the actual training phase. Following frame 202, the method advances to frame 204. In frame 204, the method includes organizing the corrective weights 112 of the plurality of synapses 118 in the corrective weight array 119. As described above with respect to the structure of the p-net 100, each synapse 118 is connected to one of the plurality of inputs 102 and includes a plurality of corrective weights 112.

After frame 204, the method proceeds to frame 206, in which the method includes generating the neuron sum array 120 via the plurality of neurons 116. As described above with respect to the structure of the p-net 100, each neuron 116 has at least one output 117 and is connected with at least one of the plurality of inputs 102 via one of the plurality of synapses 118. Furthermore, each neuron 116 is configured to add up the weight values of the corrective weights 112 corresponding to each synapse 118 connected to the respective neuron. Following frame 206, in frame 208, the method includes receiving, via the controller 122, desired images 124 organized as the desired output value array 126. After frame 208, the method proceeds to frame 210, in which the method includes determining, via the controller 122, the deviation 128 of the neuron sum array 120 from the desired output value array 126 and thereby generate the deviation array 132.

Following frame 210, the method advances to frame 212. In frame 212, the method includes modifying, via the controller 122, the corrective weight array 119 using the determined deviation array 132. The modified corrective weight values of the modified corrective weight array 119 may subsequently be added or summed up and then used to determine a new neuron sum array 120. The summed modified corrective weight values of the modified corrective weight array 119 may then serve to reduce or minimize the deviation of the neuron sum array 120 from the desired output value array 126 and generate the trained corrective weight array 134. The deviation array 132 may be determined as sufficiently minimized when the deviation 128 of the neuron sum array 120 from the desired output value array 126 is within an acceptable range 139 of the array of target deviation 138, as described above with respect to the structure of the p-net 100A. The trained corrective weight array 134 includes the trained corrective weights 112A determined using the deviation array 132 and thereby trains the p-net 100.

As described above with respect to the structure of the p-net 100, each of the training input value array 107, the corrective weight array 119, neuron sum array 120, desired output value array 126, deviation array 132, trained corrective weight array 134, and target deviation array 138 may be organized, respectively, as the training input value matrix 141, corrective weight matrix 142, neuron sum matrix 143, desired output value matrix 144, deviation matrix 145, trained corrective weight matrix 146, and target deviation matrix 148. In frame 212, the method may further include partitioning, via the controller 122, at least one of the respective training input value matrix 141, input value matrix 141A, corrective weight matrix 142, neuron sum matrix 143, and desired output value matrices 144 into respective sub-matrices. Such resultant sub-matrices may be communicated to the data processor 150 for separate mathematical operations therewith to thereby facilitate concurrent data processing and an increase in speed of training of the p-net 100.

In frame 212 the method may also include modifying, via the controller 122, the corrective weight matrix 142 by applying an algebraic matrix operation to the training input value matrix 141 and the corrective weight matrix to thereby train the p-net 100. Such a mathematical matrix operation may include determining a mathematical product of the training input value matrix 141 and corrective weight matrix 142 to thereby form the current training epoch weight matrix 151. In frame 212 the method may additionally include subtracting, via the controller 122, the neuron sum matrix 143 from the desired output value matrix 144 to generate the matrix of deviation of neuron sums 153. Also, in frame 212 the method may include dividing, via the controller 122, the matrix of deviation of neuron sums 153 by the number of inputs connected to the respective neuron 116 to generate the matrix of deviation per neuron input 155.

Furthermore, in frame 212 the method may include determining, via the controller 122, the number of times each corrective weight 112 was used during one training epoch of the p-net 100. And, the method may, moreover, include forming, via the controller 122, the averaged deviation matrix 157 for the one training epoch using the determined number of times each corrective weight 112 was used during the particular training epoch. For example, such an operation may include dividing, element-by-element, the matrix of deviation per neuron input by the determined number of times each corrective weight was used during the particular training epoch to obtain averaged deviation for each corrective weight 112 used during the one training epoch, thereby forming the averaged deviation matrix 157 for the one training epoch.

Additionally, other matrix-based operations may be employed in frame 212, to form an averaged deviation matrix 157 for the one training epoch using, for example, arithmetic mean, geometric mean, harmonic mean, root mean square, etc. Also, in frame 212 the method may include adding, via the controller 122, the averaged deviation matrix 157 for the one training epoch to the corrective weight matrix 142 to thereby generate the trained corrective weight matrix 146 and complete the particular training epoch. Accordingly, by permitting matrix operations to be applied to all the corrective weights 112 in parallel, the method 200 facilitates concurrent, and therefore enhanced speed, training of the p-net 100 in generating the trained p-net 100A.

Following frame 212, method 200 may include returning to frame 202 to perform additional training epochs until the deviation array 132 is sufficiently minimized. In other words, additional training epochs may be performed to converge the neuron sum array 120 on the desired output value array 126 to within the predetermined deviation or error value, such that the p-net 100 may be considered trained and ready for operation with new input images 106. Accordingly, after frame 212, the method may proceed to frame 214 for image recognition using the trained p-net 100A (shown in FIG. 3).

In the embodiment of image recognition using the trained p-net 100A, in frame 214, the method 200 includes receiving the input images 106 via the plurality of inputs 102. As described above with respect to the structure of the p-net 100A, the input images 106 may be either received as the input value array 107A or codified as the input value array during recognition of the images by the p-net 100A. Following frame 214, in frame 216, the method includes attributing to each synapse 118 a plurality of trained corrective weights 112A of the trained corrective weight array 134. After frame 216, the method advances to frame 218.

In frame 218, the method includes adding up the weight values of the trained corrective weights 112A corresponding to each synapse 118 connected to the respective neuron 116. As described above with respect to the structure of the p-net 100, such summing of the weight values of the trained corrective weights 112A enables the plurality of neurons 116 to generate a recognized images array 136, thereby providing recognition of the input images 106. As described above with respect to the structure of the p-net 100A, in addition to the matrices 141, 142, 143, 144, 145, 146, and 148 used for training, the input value array 107A and the recognized images array 136 may be organized, respectively, as the input value matrix 141A and the recognized images matrix 147.

In frame 218, the method may also include partitioning, via the controller 122, any of the employed matrices, such as the input value matrix 141A, into respective sub-matrices. Such resultant sub-matrices may be communicated to the data processor 150 for separate mathematical operations therewith to thereby facilitate concurrent data processing and an increase in speed of image recognition of the p-net 100A. Analogous to the effect matrix operations impart to the training portion of the method 200 in frames 202-212, the image recognition portion in frames 214-218 benefits from enhanced speed, when algebraic matrix operations are applied in parallel to the matrices or sub-matrices of the trained p-net 100A. Accordingly, by permitting matrix operations to be applied to all the trained corrective weights 112A in parallel, the method 200 facilitates concurrent, and therefore enhanced speed, image recognition using the p-net 100A. Following frame 218 the method may return to frame 202 for additional training, as described with respect to FIG. 2, if the achieved image recognition is deemed insufficiently precise, or the method may conclude in frame 220.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A neural network comprising:
a plurality of inputs to the neural network configured to receive training images, wherein the training images are one of received as a training input value array and codified as the training input value array during training of the neural network;
a plurality of synapses, wherein each synapse is connected to one of the plurality of inputs and includes a plurality of corrective weights, wherein each corrective weight is defined by a weight value, and wherein the corrective weights of the plurality of synapses are organized in a corrective weight array;
a plurality of neurons, wherein each neuron has at least one output and is connected with at least one of the plurality of inputs via at least one of the plurality of synapses, and wherein each neuron is configured to add up the weight values of the corrective weights corresponding to each synapse connected to the respective neuron, such that the plurality of neurons generate a neuron sum array; and
a controller configured to:
receive desired images organized as a desired output value array;
determine a deviation of the neuron sum array from the desired output value array and generate a deviation array; and
modify the corrective weight array using the determined deviation array, such that adding up the modified corrective weight values to determine the neuron sum array reduces the deviation of the neuron sum array from the desired output value array to generate a trained corrective weight array and thereby facilitate concurrent training of the neural network.

2. The neural network of claim 1, wherein in a trained neural network:
the plurality of inputs to the neural network are configured to receive input images, wherein the input images are one of received as an input value array and codified as the input value array during recognition of the images by the neural network;
each synapse includes a plurality of trained corrective weights of the trained corrective weight array; and
each neuron is configured to add up the weight values of the trained corrective weights corresponding to each synapse connected to the respective neuron, such that the plurality of neurons generate a recognized images array, thereby providing recognition of the input images.

3. The neural network of claim 2, further comprising a set of distributors, wherein the set of distributors is configured to codify each of the training images and input images as the respective training input value array and input value array, and wherein the set of distributors is operatively connected to the plurality of inputs for receiving the respective training images and input images.

4. The neural network of claim 1, wherein the controller is additionally programmed with an array of target deviation of the neuron sum array from the desired output value array, and wherein the controller is additionally configured to complete training of the neural network when the deviation of the neuron sum array from the desired output value array is within an acceptable range of the array of target deviation.

5. The neural network of claim 2, wherein the training input value array, input value array, corrective weight array, neuron sum array, desired output value array, deviation array, trained corrective weight array, recognized image array, and target deviation array is organized, respectively, as a training input value matrix, input value matrix, corrective weight matrix, neuron sum matrix, desired output value matrix, deviation matrix, trained corrective weight matrix, recognized image matrix, and target deviation matrix.

6. The neural network of claim 5, further comprising a plurality of data processors, wherein the controller is additionally configured to partition at least one of the respective input value, training input value, corrective weight, neuron sum, and desired output value matrices into respective sub-matrices and communicate a plurality of the resultant sub-matrices to the plurality of data processors for separate parallel mathematical operations therewith to thereby facilitate concurrent data processing and an increase in speed of one of image recognition of the input value matrix and training of the neural network.

7. The neural network of claim 5, wherein the controller modifies the corrective weight matrix by applying an algebraic matrix operation to the training input value matrix and the corrective weight matrix to thereby train the neural network.

8. The neural network of claim 7, wherein the mathematical matrix operation includes a determination of a mathematical product of the training input value and corrective weight matrices to thereby form a current training epoch weight matrix.

9. The neural network of claim 8, wherein the controller is additionally configured to:
  subtract the neuron sum matrix from the desired output value matrix to generate a matrix of deviation of neuron sums; and
  divide the matrix of deviation of neuron sums by the number of inputs connected to the respective neuron to generate a matrix of deviation per neuron input.

10. The neural network of claim 9, wherein the controller is additionally configured to:
  determine a number of times each corrective weight was used during one training epoch of the neural network;
  form an averaged deviation matrix for the one training epoch using the determined number of times each corrective weight was used during the one training epoch; and
  add the averaged deviation matrix for the one training epoch to the corrective weight matrix to thereby generate the trained corrective weight matrix and complete the one training epoch.

11. A method of operating a neural network, comprising:
  receiving training images via a plurality of inputs to the neural network, wherein the training images are one of received as a training input value array and codified as the training input value array during training of the neural network;
  organizing corrective weights of a plurality of synapses in a corrective weight array, wherein each synapse is connected to one of the plurality of inputs and includes a plurality of corrective weights, and wherein each corrective weight is defined by a weight value;
  generating a neuron sum array via a plurality of neurons, wherein each neuron has at least one output and is connected with at least one of the plurality of inputs via one of the plurality of synapses, and wherein each neuron is configured to add up the weight values of the corrective weights corresponding to each synapse connected to the respective neuron;
  receiving, via a controller, desired images organized as a desired output value array;
  determining, via the controller, a deviation of the neuron sum array from the desired output value array and generate a deviation array; and
  modifying, via the controller, the corrective weight array using the determined deviation array, such that adding up the modified corrective weight values to determine the neuron sum array reduces the deviation of the neuron sum array from the desired output value array to generate a trained corrective weight array and thereby facilitate concurrent training of the neural network.

12. The method of claim 11, wherein in a trained neural network:
  receiving input images via the plurality of inputs to the neural network, wherein the input images are one of received as an input value array and codified as the input value array during recognition of the images by the neural network;
  attributing to each synapse a plurality of trained corrective weights of the trained corrective weight array, wherein each trained corrective weight is defined by a weight value; and
  adding up the weight values of the trained corrective weights corresponding to each synapse connected to the respective neuron, such that the plurality of neurons generate a recognized images array, thereby providing recognition of the input images.

13. The method of claim 12, further comprising codifying, via a set of distributors, each of the training images and input images as the respective training input value array and input value array, wherein the set of distributors is operatively connected to the plurality of inputs for receiving the respective training images and input images.

14. The method of claim 11, wherein the controller is additionally programmed with an array of target deviation of the neuron sum array from the desired output value array, the method further comprising, completing, via the controller, training of the neural network when the deviation of the neuron sum array from the desired output value array is within an acceptable range of the array of target deviation.

15. The method of claim 12, further comprising organizing the training input value array, input value array, corrective weight array, neuron sum array, desired output value array, deviation array, trained corrective weight array, recognized image array, and target deviation array, respectively, as a training input value matrix, input value matrix, corrective weight matrix, neuron sum matrix, desired output value matrix, deviation matrix, trained corrective weight matrix, recognized image matrix, and target deviation matrix.

16. The method of claim 15, wherein the neural network additionally includes a plurality of data processors, the method further comprising partitioning, via the controller, at least one of the respective input value, training input value, corrective weight, neuron sum, and desired output value matrices into respective sub-matrices and communicating a plurality of the resultant sub-matrices to the plurality of data processors for separate parallel mathematical operations therewith to thereby facilitate concurrent data processing and an increase in speed of one of image recognition of the input value matrix and training of the neural network.

17. The method of claim 15, further comprising modifying, via the controller, the corrective weight matrix by applying an algebraic matrix operation to the training input value matrix and the corrective weight matrix to thereby train the neural network.

18. The method of claim 17, wherein applying the mathematical matrix operation includes determining a mathematical product of the training input value and corrective weight matrices to thereby form a current training epoch weight matrix.

19. The method of claim 18, further comprising:
subtracting, via the controller, the neuron sum matrix from the desired output value matrix to generate a matrix of deviation of neuron sums; and
dividing, via the controller, the matrix of deviation of neuron sums by the number of inputs connected to the respective neuron to generate a matrix of deviation per neuron input.

20. The method of claim 19, further comprising:
determining, via the controller, a number of times each corrective weight was used during one training epoch of the neural network;
forming, via the controller, an averaged deviation matrix for the one training epoch using the determined number of times each corrective weight was used during the one training epoch; and
adding, via the controller, the averaged deviation matrix for the one training epoch to the corrective weight matrix to thereby generate the trained corrective weight matrix and complete the one training epoch.

21. A non-transitory computer-readable storage device for operating an artificial neural network, the storage device encoded with instructions executable to:
receive training images via a plurality of inputs to the neural network, wherein the training images are one of received as a training input value array and codified as the training input value array during training of the neural network;
organize corrective weights of a plurality of synapses in a corrective weight array, wherein each synapse is connected to one of the plurality of inputs and includes a plurality of corrective weights, and wherein each corrective weight is defined by a weight value;
generate a neuron sum array via a plurality of neurons, wherein each neuron has at least one output and is connected with at least one of the plurality of inputs via one of the plurality of synapses, and wherein each neuron is configured to add up the weight values of the corrective weights corresponding to each synapse connected to the respective neuron;
receive desired images organized as a desired output value array;
determine a deviation of the neuron sum array from the desired output value array and generate a deviation array; and
modify the corrective weight array using the determined deviation array, such that adding up the modified corrective weight values to determine the neuron sum array reduces the deviation of the neuron sum array from the desired output value array to generate a trained corrective weight array and thereby facilitate concurrent training of the neural network.

22. The storage device of claim 21, further encoded with instructions executable to:

receive input images via the plurality of inputs to the neural network, wherein the input images are one of received as an input value array and codified as the input value array during recognition of the images by the neural network;
attribute to each synapse a plurality of trained corrective weights of the trained corrective weight array, wherein each trained corrective weight is defined by a weight value; and
add up the weight values of the trained corrective weights corresponding to each synapse connected to the respective neuron, such that the plurality of neurons generate a recognized images array, thereby providing recognition of the input images.

23. An apparatus for operating an artificial neural network, comprising:
a means for receiving training images via a plurality of inputs to the neural network, wherein the training images are one of received as a training input value array and codified as the training input value array during training of the neural network;
a means for organizing corrective weights of a plurality of synapses in a corrective weight array, wherein each synapse is connected to one of the plurality of inputs and includes a plurality of corrective weights, and wherein each corrective weight is defined by a weight value;
a means for generating a neuron sum array via a plurality of neurons, wherein each neuron has at least one output and is connected with at least one of the plurality of inputs via one of the plurality of synapses, and wherein each neuron is configured to add up the weight values of the corrective weights corresponding to each synapse connected to the respective neuron;
a means for receiving desired images organized as a desired output value array;
a means for determining a deviation of the neuron sum array from the desired output value array and generate a deviation array; and
a means for modifying the corrective weight array using the determined deviation array, such that adding up the modified corrective weight values to determine the neuron sum array reduces the deviation of the neuron sum array from the desired output value array to generate a trained corrective weight array and thereby facilitate concurrent training of the neural network.

24. The apparatus of claim 23, wherein in a trained neural network:
a means for receiving input images via the plurality of inputs to the neural network, wherein the input images are one of received as an input value array and codified as the input value array during recognition of the images by the neural network;
a means for attributing to each synapse a plurality of trained corrective weights of the trained corrective weight array, wherein each trained corrective weight is defined by a weight value; and
a means for adding up the weight values of the trained corrective weights corresponding to each synapse connected to the respective neuron, such that the plurality of neurons generate a recognized images array, thereby providing recognition of the input images.

* * * * *